May 13, 1930.  S. M. CHASE  1,757,953
TRUCK
Filed June 8, 1927  2 Sheets-Sheet 1
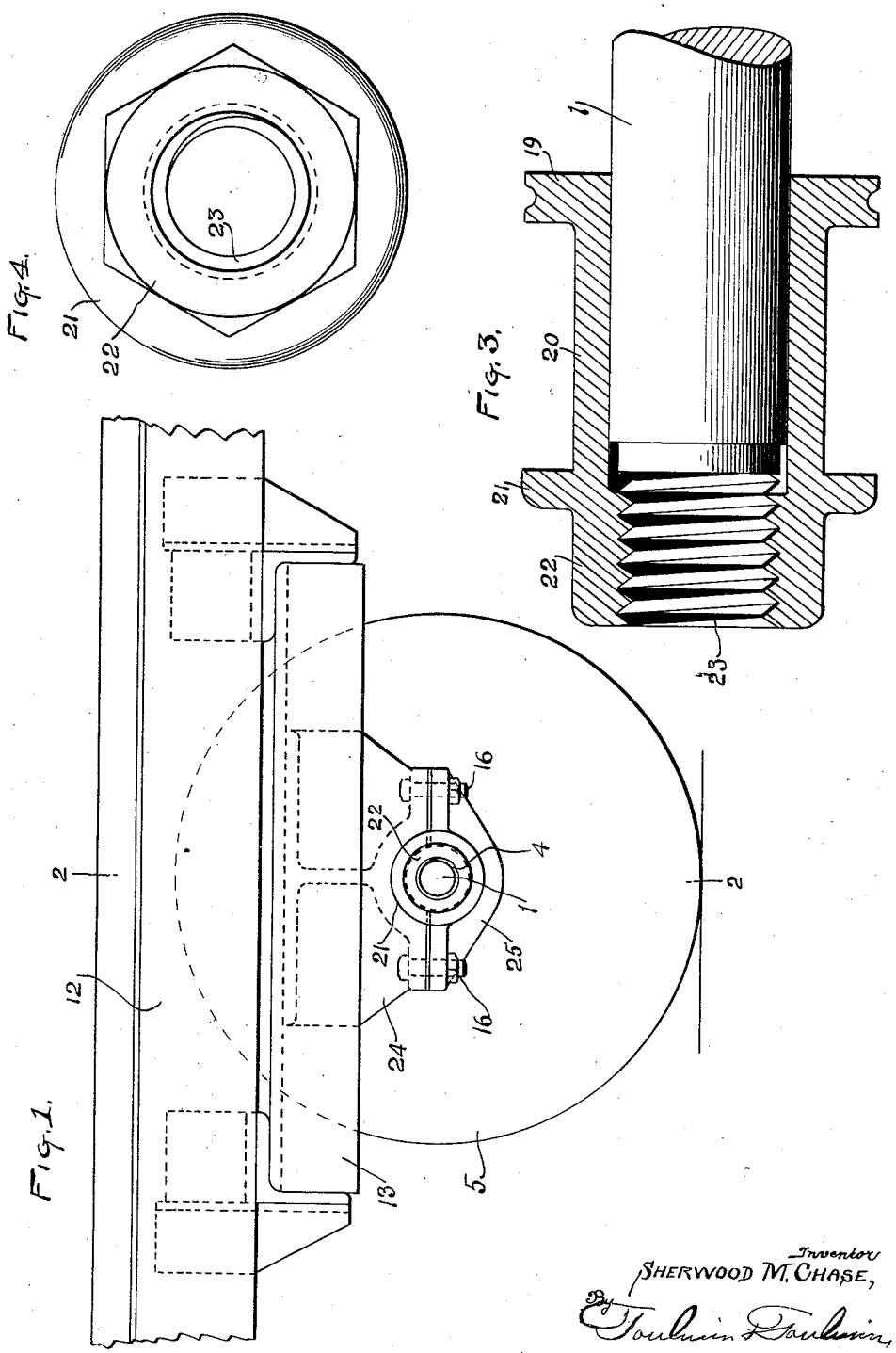
Inventor
SHERWOOD M. CHASE,
By Toulmin & Toulmin,
Attorneys May 13, 1930.  S. M. CHASE  1,757,953
TRUCK
Filed June 8, 1927  2 Sheets-Sheet 2
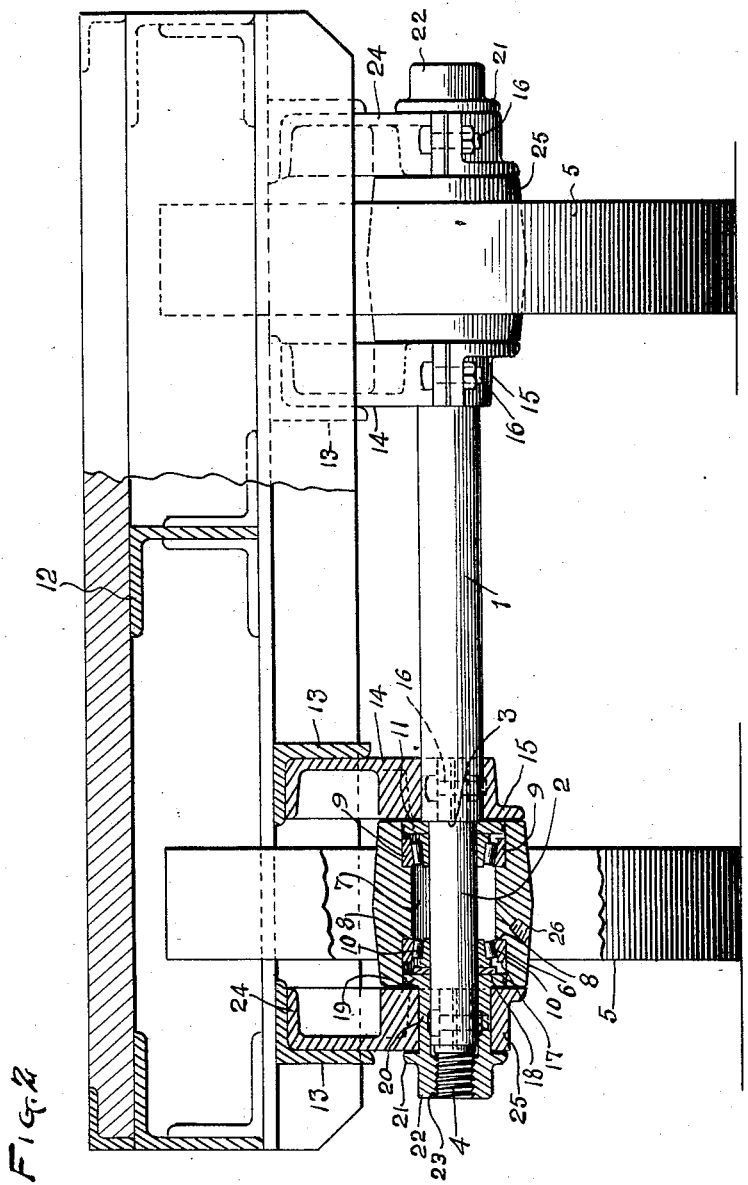
Inventor
SHERWOOD M. CHASE,
By Toulmin & Toulmin,
Attorneys Patented May 13, 1930

1,757,953

UNITED STATES PATENT OFFICE

SHERWOOD M. CHASE, OF COLUMBUS, OHIO, ASSIGNOR TO THE CHASE FOUNDRY AND MANUFACTURING COMPANY, OF COLUMBUS, OHIO, A CORPORATION OF OHIO

TRUCK

Application filed June 8, 1927. Serial No. 197,255.

My invention relates to trucks and the bearings therefor.

It is the object of my invention to provide adjusting mechanism for adjustable roller bearings on trucks where the truck bracket is located on the outside of the wheel or there are brackets on both the outside and inside of the wheel.

It is a further object of my invention to provide means for adjusting the adjustable roller bearings from the outside of the car and for then utilizing the outside bracket for clamping the adjusting nut in position so that the adjustment so secured will remain without further adjustment and without losing the adjustment already secured.

It will be understood that this invention is applicable to any type of bearing whether in a vehicle or not and any type of vehicle.

Referring to the drawings:

Figure 1 is a side elevation of one end of the truck and axle showing the arrangement of several parts.

Figure 2 is a section on the line 2—2 of Figure 1.

Figure 3 is an enlarged section of the bearing adjusting nut with the end of the axle in side elevation.

Figure 4 is an enlarged end elevation of the adjusting nut.

Referring to the drawings in detail, 1 is an axle having a reduced portion 2, there being a shoulder 3 at the point of junction between the main and reduced portions. The end of the axle terminates in a thread 4.

A wheel 5 is provided with a hub 6 having an aperture 7 therethrough with shoulders 8 for engaging the gauges 9 of tapered bearings 10. The inside tapered bearing is engaged on the other side opposite to the shoulder 8 by the retaining plate 11. This plate fits against the shoulder 3. The car body 12 is provided with a pair of spaced bracket flanges 13.

The inside bracket flange is connected to the inside depending upper bracket member 14, in which the axle 1 rides, while the lower side of the axle is embraced by the bracket cap 15. This cap is held in position by suitable bolts 16. The other tapered roller bearing 17 has a retaining plate 18, which in turn is engaged by the flange 19 of the bearing adjusting nut. This flange fits within the enlarged opening 7 in the hub 6.

The flange 19 is carried on the sleeve 20 of the bearing adjusting nut. The other end of this sleeve is provided with a second flange 21 and a projecting sleeve 22 internally threaded at 23 for engaging threads 4 of the axle 1. The exterior of the sleeve 22 is hexagonal, providing an engaging surface for a wrench.

The space between the flanges 19 and 21 on top of the sleeve 20 is occupied by the outside upper bearing bracket 24 while the lower side of the sleeve 20 between the flanges 19 and 21 is occupied by the bracket cap 25. The two halves of the bracket are connected together by the bolt 16.

A suitable oil passageway for lubricating the bearing is provided in the hub 6, as at 26.

Method of operation

When it is desired to adjust the bearing or the bearings the lower bracket cap 25 is removed and the nut for adjusting the bearing is positioned on the axle 1 through the screw threads 23 and 4. When this adjustment is complete and satisfactory the adjusting nut is then clamped in position by the application of the bracket cap 25 and the clamping of the bracket cap thereto and to the upper bracket by the bolt 16.

Thus it is possible to have an outside bracket and at the same time securing an adjustment by utilizing the bracket in two pieces, the outer or lower bracket fitting over the special thimble, which is a part of the nut. The clamping of the bracket parts clamps this thimble in position, preventing the nut from turning in either direction.

It will be observed that this construction is applicable not only to vehicles but to any place where bracket supports for axles and the like are necessary, and where the bearings must be adjusted.

It will be understod that I desire to comprehend within my invention such modifications as may be necessary to adapt it to varying conditions and uses.

Having thus fully described my invention what I claim is new and desire to secure by Letters Patent is:

1. In combination, an axle, a wheel, bearings therefor adapted to be adjusted, means mounted on said axle for adjusting said bearing, and means independent of the axle for clamping said adjusting means in adjusted position.

2. In combination, an axle, a wheel with a hollow hub, bearings mounted therein, means for adjusting the position of said bearings with respect to the hub and the axle, supporting means for said axle on the outside of said bearing and wheel, and means on said supporting means to clamp said adjusting means in position.

3. In combination, a wheel, an axle, bearings in the hub of said wheel mounted on said axle, an adjusting means adjustably positioned on said axle engaging with said bearings for adjusting the position thereof, a supporting bracket for said axle, and means thereon to clamp said adjusting means in adjusted position and to retain said adjusting means and axle on said bracket.

4. In combination, a wheel having a hollow hub, spaced bearings therein, an axle mounted in said bearings, a bracket for supporting said axle, an adjusting nut having an inwardly projecting sleeve mounted on said axle, said nut being threaded on the end of the axle, a head on said nut for engaging one of said bearings to adjust it, and a clamp on said bracket for engaging said sleeve and retaining the axle in position as well as clamping the adjusting nut in adjusted position.

5. In combination, an axle having a threaded end, a wheel having a hollow hub with spaced shoulders on the interior of said hub, bearings mounted against said shoulders, a retaining plate for one of said bearings, a bracket adapted to support said axle engaging the end of the hub and said retaining plate, a second outer bracket mounted on the other side of said hub, a bearing on said axle within said hub in engagement with the shoulder on that side of the hub, an adjusting nut consisting of an internally threaded portion engaging the threaded end of said axle, a sleeve adapted to engage said second bracket and having a head adapted to engage said last bearing, and means on said second bracket for retaining said sleeve in engagement with the bearing, and clamping said adjusting nut in adjusted position.

6. In combination, a rotating wheel having a hub, bearings carried in the hub thereof, a stationary axle, adjusting means for adjusting said bearings mounted on said axle, means to support said axle, and means on said support to clamp said axle and its adjusting means to said support to prevent the rotation of the adjusting means and the axle.

7. In combination, a wheel having a hollow hub with spaced shoulders, tapered roller bearings located in said hub against said shoulders, a plate engaging the outer end of one of said bearings in said hub, an axle passing through said bearings, said axle having a shoulder engaging said plate, a bracket adapted to support said axle adjacent said plate and the hub of the wheel, a second bracket on the other side of the hub adapted to support said axle, an adjusting nut threaded on the end of said axle consisting of a nut portion and sleeve, spaced flanges on said sleeves engaging said second-mentioned bracket, the inner of said flanges being adapted to engage the bearing located between it and one of the shoulders in the hub of the wheel for adjusting the bearings, and a clamp mounted on said bracket adapted to engage between said flanges on said sleeve for maintaining the adjusting nut and axle in clamped adjusted non-rotating position.

8. In combination, a wheel having a hollow hub, spaced tapered bearings mounted in said hub, an axle mounted on said bearings having a shoulder adapted to engage with one of said bearings, a shouldered adjustable sleeve mounted on the end of the axle for engaging the other of said bearings, a supporting bracket for said axle, and means on said bracket to clamp said sleeve, axle and bracket one to the other to prevent rotation thereof while permitting the free rotation of the wheel on the bearings and axle.

In testimony whereof, I affix my signature.

SHERWOOD M. CHASE.